INVENTOR.
JAMES R. ROGERS

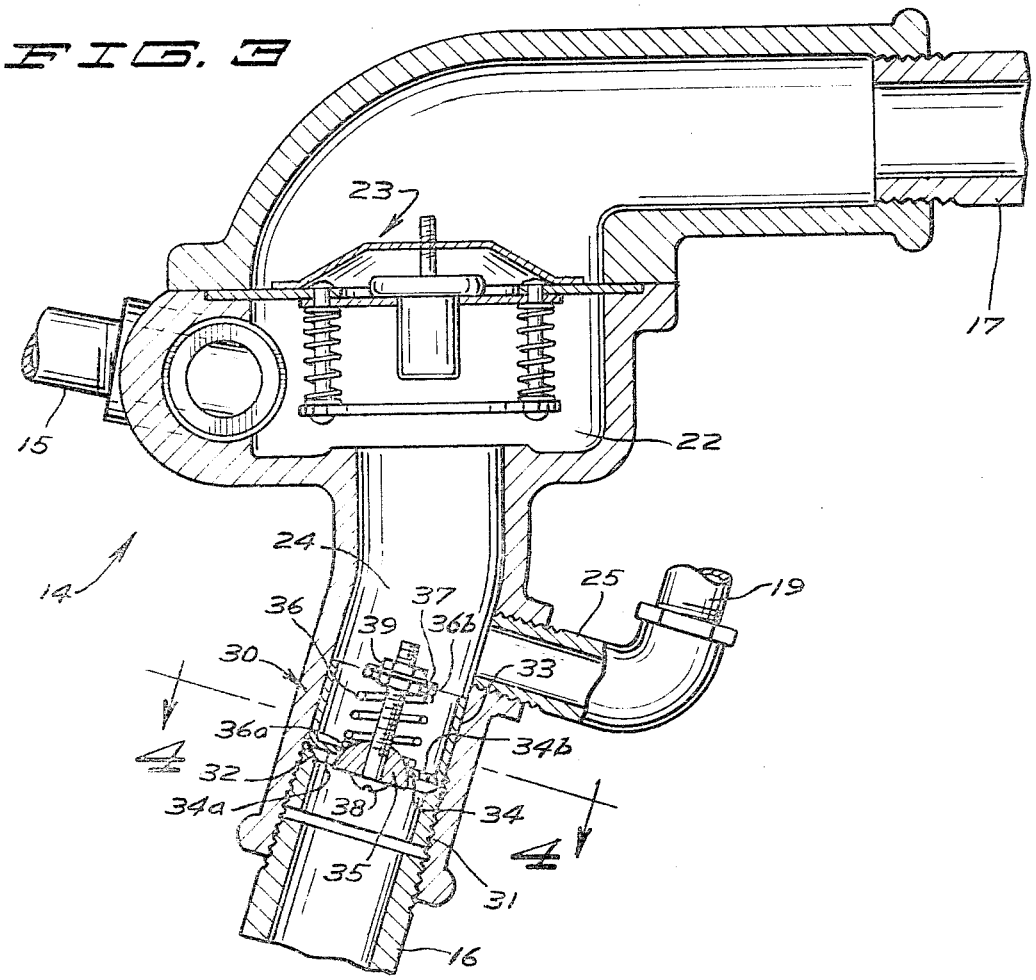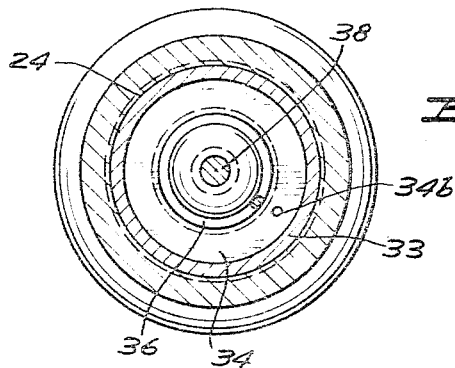

United States Patent Office 3,302,696
Patented Feb. 7, 1967

3,302,696
PRESSURE RESPONSE BY-PASS VALVE FOR
HEAT EXCHANGE SYSTEMS
James R. Rogers, 407 4th St., P.O. Box 6,
Sauk Centre, Minn. 56378
Filed Feb. 8, 1965, Ser. No. 431,226
3 Claims. (Cl. 165—37)

This invention relates generally to heat exchanger systems and more particularly to a pressure responsive by-pass valve for particularly controlling the flow of fluid through a heat exchanger system.

It is well known that most heat transfer equipment is based on a simple gravity flow of fluids which flow is accelerated through the use of centrifugal pumps. This statement assumes one type of transfer equipment and, of course, other types which includes other pumps such as positive displacement or constant speed pumps are also well known. The system as provided herein and particularly the by-pass valve included herein allows the build up of particular pressures and thus various pressure differentials within the system and controls the volume of flow to the various heat exchange elements by controlling the by-pass flow. The most common need for the structure as provided herein is that of controlling the flow of fluid to automobile heaters. Many heaters and particularly those of some well-known European automobiles as well as many domestic conveyances do not heat the passenger compartment of the car to any sufficient degree when the outside temperature is particularly cold or when the engine is operating at low r.p.m. Through experimentation applicant has found that the prime reason for this lack of passenger compartment heating is the lack of sufficient pressure to force the required volume of water heated by the engine to the passenger compartment heater and this is particularly true at both low speeds and situations when the outside temperature is particularly low.

A similar situation exists in the operation of small marine engines which are provided with what is known as an open cooling system. In this case the intake coolant temperature is often low and difficult to control but the case of a by-pass and valve controlling the by-pass as described herein would permit tempering of the intake coolant and thus better temperature control of the entire system.

Although the description of the specification will relate primarily to a use for an automobile, it should be obvious that this principle and valve element could be applied to any unit which included a heat source, means for pumping coolant through the heat source, and heat exchangers for dissapating the heat absorbed by the coolant as it passes through the heat source. The basic principle of this invention is to aid in controlling the volume of coolant flowing through the various heat exchangers by controlling the volume of coolant flowing through the by-pass conduit in response to the various pressure differentials existing in the system.

The apparatus of this invention is designed for operation with a heat exchange unit having a heat source, pumping means for pumping coolant through the heat source and at least a pair of heat exchangers. A by-pass system may also be provided such that the coolant may be recirculated to the source should various other valves in the system prevent the delivery of coolant to other portions of the system such as the heat exchangers.

One object of this invention is to provide a pressure responsive by-pass control member which will control the pressure differential within the system to permit the flow of normally by-passed coolant to flow through the various portions of the system which portions are in partial or intermittent use and further to permit recirculation of this coolant to the source when the flow to these other portions is reduced or completely shut off.

It is therefore an object of applicant's invention to provide a pressure responsive by-pass control member for a heat exchanger system which will facilitate control of pressure differentials throughout the system.

It is a further object of applicant's invention to provide a pressure responsive by-pass control member insertable into an available by-pass conduit of a heat exchanger system for controlling the flow of fluid through the system in response to a build up of pressure of the fluid.

It is a specific object of applicant's invention to provide a by-pass conduit insertion unit receivable into the by-pass conduit of an automobile heat exchange system such that a greater amount of heated coolant will be directed to the heat exchanger positioned in the passenger compartment of an auto to provide effective heating for the compartment.

These and other objects and advantages of my invention will more fully appear from the following description made in connection with the accompanying drawings, wherein like reference characters refer to the same or similar parts throughout the several views, and in which:

FIG. 3 is a vertical cross section through the control portion of the heat exchanger system illustrating the placement of the cooperative control elements.

FIG. 4 is a transverse section taken substantially along line 4—4 of FIG. 3.

As illustrated in the accompanying drawings, the apparatus of this invention is designed to control the flow of coolant through at least a pair of heat exchangers. A general configuration for the use is illustrated in the schematic view of FIG. 1 while a specific application is illustrated in the schematic view of FIG. 2.

Figure 1:
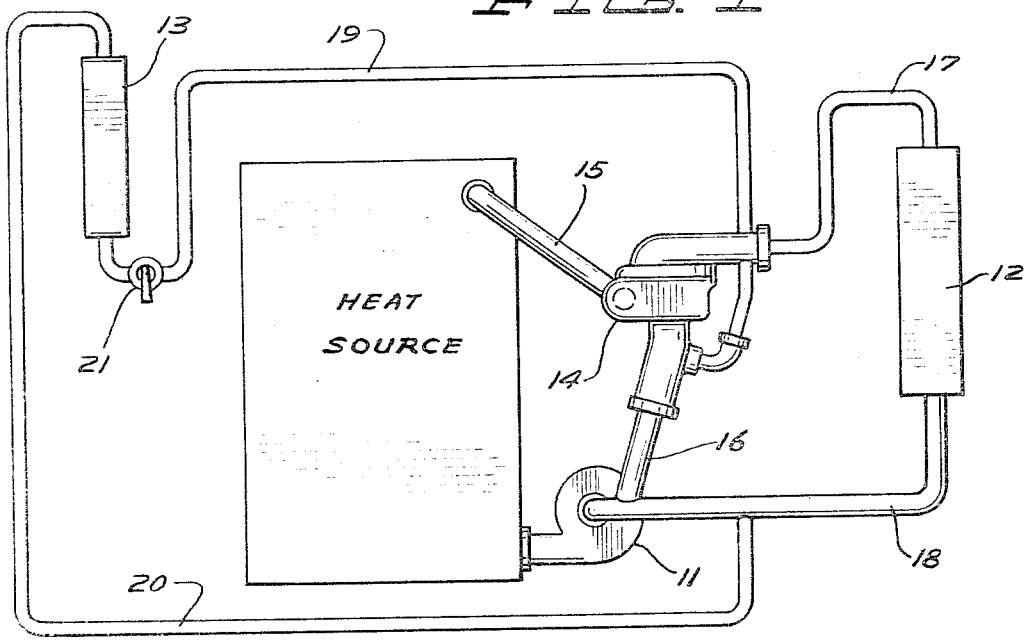
FIG. 1 is a schematic illustration of a heat exchanger system provided with the control apparatus of this invention.
Figure 2:
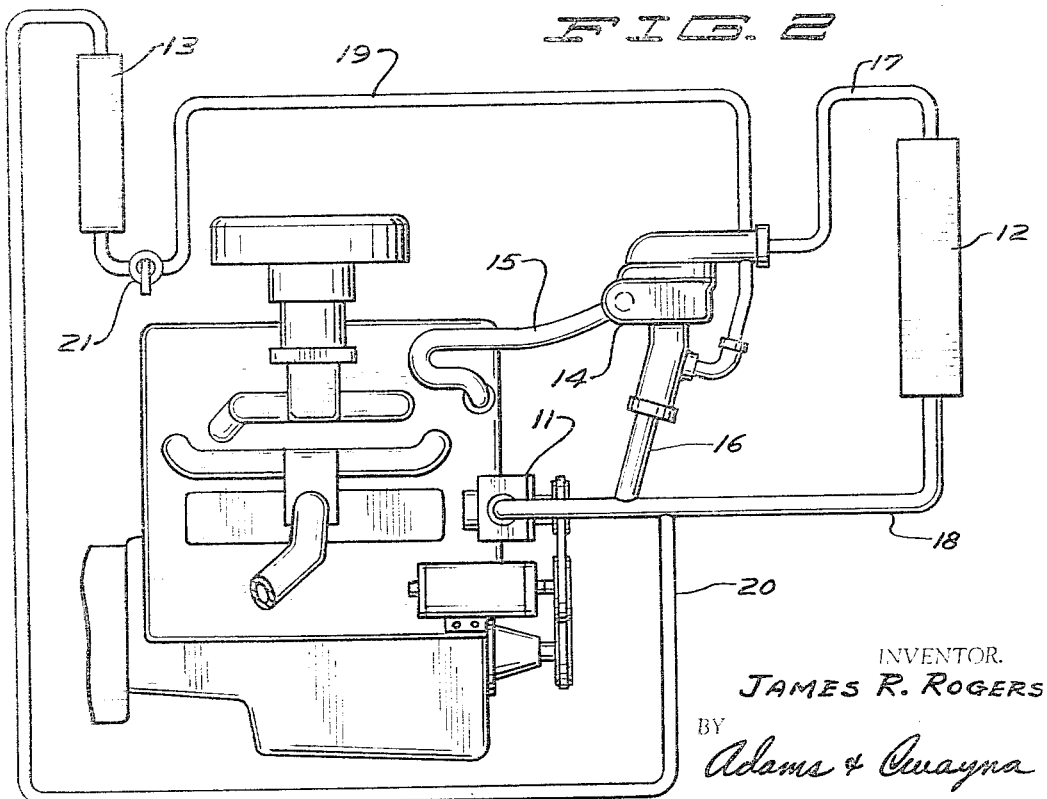
FIG. 2 is a schematic illustration of an automotive cooling system which is provided with the apparatus of applicant's invention.

FIG. 1, as illustrated, includes a heat source, circulating pump 11, a pair of heat exchangers 12–13 and a fluid flow control member 14 designed to receive heated coolant from the heat source through conduit 15 and to deliver the heated coolant either through a by-pass 16 such that it is returned for recirculation through the heat source or to heat exchanger 12 through conduit 17 whereafter the heat exchange process, the coolant, is redelivered to the pump 11 through conduit 18. As an alternate coolant may flow through conduit 19 into heat exchanger 13 provided control valve 21 is open and is then recirculated to pump 11. In the specific illustration of FIG. 2, the reference numerals are identical to the numerals used in FIG. 1 as the function of the parts and the arrangement is exactly the same with the only variation being that the heat source now is illustrated as an automobile engine and the heat exchanger 13 would be termed a passenger compartment heater and heat exchanger 12 would be termed the radiator of the auto. The control portion 14 of this illustration which also houses the pressure responsive by-pass control valve which is the object of this invention, is illustrated in full section in FIG. 4 and includes an inlet chamber 22 receiving heated coolant from the heat source through conduit 15 and which is usually provided with a thermostatic temperature responsive control member 23 more commonly known as a thermostat.

Thermostat 23 is actuated in response to the temperature of fluid entering chamber 22 and controls flow therefrom to radiator 12 through conduit 17. A thermostat being temperature responsive will open when the fluid communicating therewith reached a predetermined temperature and will direct the fluid to the auto radiator 12 where through the heat exchange process the temperature will be lowered and the now cooled fluid will be recycled back to the heat source or engine. This, of course, allows the engine to operate at an optimum predetermined temperature. Normally, the operation of thermostat 23 is oscillatory in that it will open and close periodically whenever the coolant temperature rises above the predetermined temperature and when the coolant is below the thermostat opening temperature, it will be closed thus recycling the fluid through pump 11 by flowing from chamber 22 through by-pass conduit 16.

In the form shown, by-pass conduit 16 receives the fluid through a passage 24 communicating with chamber 22. A portion of the by-pass fluid is likewise directed through conduit 19 to the compartment heater 13. In the form shown, an elbow unit 25 communicates with passage 24 to receive the fluid therefrom and direct the same to conduit 19. This flow through conduit 19 is provided only to the automobile heater 13 when the valve member 21 to the passenger heater 13 is in the open position and naturally this would be only during the winter or cooler months.

Ordinarily due to the size of the by-pass conduit 16 in many automobiles and particular European automobiles, the amount of fluid entering conduit 19 and thus the compartment heater 13 is minimum. In this particular application, however, applicant provides a pressure responsive by-pass control valve generally designated 30 insertable into the by-pass passage 24 which will control flow through by-pass conduit 16. Valve 30 is positioned in conduit 24 by providing a positioning sleeve 31 internally threaded into conduit 24 to provide a locating shoulder 32 upon which the control member 30 may rest. Control member 30 generally comprises of a tubular housing 33 having one end thereof substantially closed by an endplate 34. Endplate 34 is provided with a central aperture 34a therethrough and a constant aperture 34b substantially small in diameter therethrough. A valve member 35 is arranged on one side of endplate 34 and consists of a generally half spherical member wherein the periphery abuts with the aperture 34a for closing and sealing thereagainst. Valve member 35 is spring loaded by providing a compression spring 36 to cooperate therewith having one end 36a acting against endplate 34 with the other end 36b acting against a valve member connecting shoulder in the form of a washer 37 which is firmly attached to valve member 35 through a bolt 38 and nut 39 arrangement.

In operation fluid pressure due to the restricted by-pass will urge valve member 35 out of sealing position with aperture 34a to permit flow of fluid therethrough. Upon a reduction in this fluid pressure, spring 36 will urge valve member 35 into sealing position closing aperture 34a as shown in FIG. 3. With the valving device in position within the by-pass passage 24 it should be obvious that a build up in pressure at low engine speeds will take place due to the now resricted by-pass which allows by-pass flow only through the constant size aperture 34b. Thus at low speeds where previously the large by-pass conduit permitted unrestricted flow such that no back pressure would build up, there is now a substantial pressure build up and likewise a larger quantity of fluid must be directed into compartment heater 13 through conduit 19.

In actual operation of this unit when an automobile engine is the primary heat source and the engine speed is low the coolant fluid will normally flow only through the heat source and through the by-pass for recirculation. At higher speeds which are result of high r.p.m. and which result in higher engine temperature, the increase in fluid temperature will cause the thermostat 23 to open. When this thermostat 23 opens, the passage through the radiator 12 will of course present less back pressure than the path through the by-pass 16 and therefore fluid will be directed to the radiator 12. This is normally a short duration route in that as soon as the coolant passes through the radiator 12, its temperature will be sufficiently lowered so as to lower the temperature of the engine and thus close thermostat 23 and again redirect fluid through the by-pass 16 and by-pass valve structure 30. During this thermostatic 23 opening which is responsive to high engine r.p.m. the pressure and velocity of the coolant is sufficient to supply a desired amount of coolant and thus heat to the passenger compartment heater 13. Also during operation it has been found that the thermostat 23 actually oscillates into open and closed position and simultaneously the by-pass control valve 30 does likewise oscillate in direct opposition to the thermostatic control 23 thus in effect maintaining sufficient pressure and velocity for the coolant such that a desired amount of coolant will pass to the passenger compartment heater 13. This situation providing a relatively constant flow of coolant to the passenger compartment heater 13, of course, results in a greater amount of heat being dissapated in the passenger compartment thereby making the compartment more comfortable.

This by-pass valving structure, as illustrated, provides an increase in the pressure of the flowing coolant and thus enables a more specific control of the volume of fluid passing into the heat exchanger of the system. From an additional viewpoint, the control chamber 32 purely provides a means for controlling the flow of fluid in response to a temperature flow control unit acting in correlation and cooperation with a pressure flow control such that the fluid may most economically be directed into more usable portions of the system.

Throughout this operative description, the use of the valve is shown as primarily directed to the increase of pressure differential problems and the relief of these problems through by-pass control. It should be assumed that this valve may definitely be of use to lower pressure differential situations and further that the valve would primarily be used in conjunction with other control valves whether these other control valves be thermostatical or manually controlled valves. The intent of the description is to provide a situation which will control temperatures at various heat exchangers within the entire system. The by-pass control valve as described herein is designed to operate in conjunction with and as an additive feature to control valves generally in use.

It should be obvious that this specific arrangement could be used in various thermal energy transfers wherein circulating fluids are used as the transfer medium and particularly when the transfer flows are throttled by thermostatic or manually operated control valves for at least a portion of the flow.

It will, of course, be understood that various changes may be made in the form, details, arrangements and proportion of parts without departing from the scope of the invention, which generally stated consists in the matter set forth in the appended claims.

What I claim is:

1. A fluid flow system having at least a heat source, a pump, first and second heat exchanger units receiving heated fluid for cooling thereof and a recirculation line by-passing the second heat exchanger and including:

(a) means for restricting the flow of fluid through said by-pass whereby a positive back pressure may be developed to provide sufficient pressure to force the heated fluid to the first of said exchangers;

(b) a temperature responsive control member controlling fluid flow to the second of said heat exchangers; and (c) said restrictor means arranged to open in response to a predetermined pressure acting thereagainst.

2. The structure set forth in claim 1 wherein said temperature responsive control member and said restricter are arranged and constructed in cooperating relation to each other to oscillate into open and closed position in alternate response to the operation of the other.

3. The structure set forth in claim 1 wherein said predetermined pressure is determined to be a pressure which is sufficient to ordinarily supply heated fluid to the first of said exchangers.

References Cited by the Examiner

UNITED STATES PATENTS

| 2,008,164 | 7/1935 | Wolf | 165—51 |
| 2,366,586 | 1/1945 | Andersen | 165—38 X |
| 3,213,930 | 10/1965 | Robinson | 165—38 |

FOREIGN PATENTS 59,196  12/1953  France.

ROBERT A. O'LEARY, *Primary Examiner.*

N. R. WILSON, *Assistant Examiner.*